United States Patent [19]

Carlson et al.

[11] Patent Number: 5,053,607
[45] Date of Patent: Oct. 1, 1991

[54] POINT-OF-SALE DEVICE PARTICULARLY ADAPTED FOR PROCESSING CHECKS

[76] Inventors: Steven R. Carlson; Paul R. Carlson, both of 417 2nd Ave., Beach, N. Dak. 58621

[21] Appl. No.: 362,164

[22] Filed: Jun. 6, 1989

Related U.S. Application Data

[63] Continuation-in-part of Ser. No. 219,735, Jul. 15, 1988, which is a continuation-in-part of Ser. No. 70,816, Jul. 6, 1987, Pat. No. 4,758,714, which is a continuation-in-part of Ser. No. 915,505, Oct. 6, 1986, Pat. No. 4,678,896.

[51] Int. Cl.$^5$ .............................................. G06F 15/30
[52] U.S. Cl. ..................................... 235/379; 235/432; 902/18; 902/39; 364/406
[58] Field of Search ................ 235/379, 432, 433, 435; 902/18, 20; 364/406

[56] References Cited

U.S. PATENT DOCUMENTS

| | | | |
|---|---|---|---|
| 3,786,421 | 1/1974 | Wostl et al. | 340/149 |
| 4,027,142 | 5/1977 | Paup et al. | 235/475 X |
| 4,404,649 | 9/1983 | Nunley et al. | 235/379 X |
| 4,439,670 | 3/1984 | Bassett et al. | 235/382 |
| 4,453,074 | 6/1984 | Weinstein | 235/380 |
| 4,617,457 | 10/1986 | Granzow et al. | 902/18 X |
| 4,678,895 | 7/1987 | Tateisi et al. | 235/379 |
| 4,810,866 | 3/1989 | Lord | 235/379 |

Primary Examiner—David L. Trafton
Attorney, Agent, or Firm—Dorr, Carson, Sloan & Peterson

[57] ABSTRACT

A check processing device is particularly adapted for retailer/customer use at the point-of-sale through use of a MICR read head means, printer means and keypad means which feed information into a CPU which communicates, through an existing telecommunication system, with the customer's bank and the retailer's bank in order to transfer funds from the account of the customer to the account of the retailer.

18 Claims, 5 Drawing Sheets

POINT-OF-SALE DEVICE PARTICULARLY ADAPTED FOR PROCESSING CHECKS

CROSS REFERENCE TO RELATED APPLICATIONS

This patent application is a continuation-in-part of our co-pending U.S. patent application Ser. No. 219,735 filed July 15, 1988 which is a continuation-in-part of U.S. patent application Ser. No. 70,816 filed July 6, 1987, now U.S. Pat. No. 4,758,714 which, in turn, is a continuation-in-part of U.S. patent application Ser. No. 915,505 filed Oct. 6, 1986, now U.S. Pat. No. 4,678,896.

FIELD OF THE INVENTION

Although there are several different ways to pay for goods or services today at the point of sale, among them cash, checks, credit cards, debit cards, drafts, the consensus seems to remain that a "cashless/checkless" society is not far in the future. Credit card trade is now highly competitive since it is profitable for the sponsoring banks as well as the merchant making the sale. Electronically transferred funds are made possible by "debit cards" which require "on line" or full-time hookups to the issuing bank, that is the bank of the cardholder [customer] and to the payee's bank (e.g., to the retailer's bank). However, this type of full time hookup requires sophisticated networking resources and a complicated interface switch system between the various participants.

Obviously "cash" sales are the most reliable (assuming no counterfeiting activities take place) for the retailer; that is to say, they are reliable because the retailer has his non-revokable funds in hand before the sale is completed. Most other kinds of transactions involve more risk. For example, credit card sales, even if "approved" by the issuing card company, have associated therewith some uncertainty on the part of the retailer because of the possibility of the sale being rescinded in view of the credit rights of the cardholder, including his right to instruct the issuing bank not to pay the retailer until whatever difficulty encountered by the customer has been resolved. Obviously, this right in effect holds the retailer's funds ransom subject to complete satisfaction of the customer in resolving the complaint whether real or imagined. Credit card sales are not a complete windfall to the card holder either; he or she is charged a percentage fee at usually higher than bank rates for "carrying" the card holder; such rates can range from a few points above prime rate to several points.

Smart cards also have received a great amount of attention; but to date, only a few experiments have been initiated in the United States. Hence the personal check remains one of the most widely used means of payment. The method of using the check has remained virtually unchanged since its conception, but the means of processing such checks has improved considerably over the years. Much of this change has come about by the Federal Reserve system's (FED's) introduction of a Magnetic Ink Character Recognition system (MICR), examples of which can be seen along the bottom of checks and other negotiable instruments. The MICR line allows high speed, electronic reading of that data designating the proper bank and account to be identified and converting such data into electronic messages to be sent through the National Automated Clearing House system.

However, the problems of handling the check at the point of sale, verifying the signature, the amount, stamping "for deposit only", etc. still remain. Moreover, the retailer usually does not know whether the presenter of the check has sufficient funds or whether the presentee of the check intends to honor the check by not filing a "stop payment" order at his bank. Several devices have been produced to aid the retailer in these situations.

BRIEF DESCRIPTION OF THE PRIOR ART

U.S. Pat. No. 3,786,421 to Wolfgang J. Wostl teaches a personal identification code number that is used to insure that the party making the transaction is the person he claims to be. U.S. Pat. No. 4,453,074 teaches a smart card with encrypted material using a private key that is associated with a public key. U.S. Pat. No. 4,439,670 teaches use of a code comparison made upon reaching a predetermined number of rejections. None of these devices is however specifically suited to processing checks at the point-of-sale.

SUMMARY OF THE INVENTION

The herein-disclosed point-of-sale device is specifically adapted to operate upon checks or other negotiable instruments in order to complete a business transaction such as a retail sale while the retailer and the customer are still face to face. It also gives both the retailer and the customer badly needed security with minimum economic expenditures to both parties. The device also can utilize several algorithm security codes simultaneously. It also can be programmed to give regional or local protection.

In its most fundamental form our point-of-sale device comprises a housing divided into two compartments. The two compartments are presented in an adjacent arrangement wherein the first compartment is located next to the second compartment, but separated from it by a slot. The compartments may be held in place relative to each other by a spacer means which holds the two compartments in their adjacent relationship relative to each other. That is to say a face of one compartment is vis-a-vis a face of the other compartment, but is separated from it by the slot which is, in effect, "sandwiched" between the two compartments. In effect the height of the spacer means is essentially the height of the slot. In some preferred embodiments hereinafter more fully described, the spacer means is provided with a hinge means in order to rotate one compartment away from the other in order to expose the slot region if need be (e.g., if the check becomes caught in said slot).

In a preferred arrangement the first compartment is presented in a stacked configuration over the second compartment. This arrangement is the one depicted in the drawings; but this is by no means the only arrangement possible. The two compartments could, for example, lay side by side. In the preferred "stacked" arrangement, the first compartment (in this case the top compartment) is the preferred compartment for locating a printer means which contacts one side of a check (preferably the rear side of the check) through a face in said first compartment. In the stacked arrangement that face would be the bottom face of the first (top) compartment. The second compartment is preferably the compartment provided with a MICR reader means which reads the other side of the check (preferably the face side of the check, i.e., the side of the check opposite the side contacted by the printer means) through a face in said second compartment.

This is the most practical arrangement, but clearly the second (bottom) compartment might contain the printer and the first (top) compartment might contain the MICR read head. It should also be noted that in the event that FED regulations placed the MICR data on the rear side of a check (or in the event the MICR information could be read through the paper from which the check is made) then both the printer means and MICR read head means could be located in either the first or the second compartment and operate on (read from and print on) the same side of the check.

The slot is also provided with means for transporting a check or other negotiable instrument into and out of said slot, means for positioning the check: (1) while it is being so transported, (2) while its MICR information is being read by the MICR head, and (3) while it is being printed upon by the printer means.

The device is provided with a CPU means which can be located inside the housing (in the first compartment and/or in the second compartment), outside the housing but still in the retail establishment where the business transaction is taking place, or outside the retail establishment in a central location which employs a central CPU to service a system of such point-of-sale devices.

The device also comprises at least one or more alpha/numeric keypad means electrically connected to the CPU. Obviously, the retailer and his customer could use the same keypad, but for reasons hereinafter more fully described, two, separate, but electronically interconnected, keypads, one for the retailer, one for the retailer's customer, are highly preferred for the check processing operations carried by our device.

Finally the device should comprise means for electronically connecting the point-of-sale device to a telecommunications system capable of electronically transferring funds from one bank account (e.g., the customer's bank account) to another bank account (e.g., the retailer's bank account).

Thus in its most general form, our point-of-sale negotiable instrument processing device comprises: (1) a housing having a first compartment, a second compartment and a spacer means which positions the first compartment next to the second compartment so as to define a slot between said first and second compartments; (2) MICR read head means for reading MICR information on a negotiable instrument; (3) printer means for printing on a negotiable instrument; (4) switching means to initiate preprogrammed CPU functions upon the negotiable instrument; (5) motive means for moving the negotiable instrument: (a) into position in the slot so as to be read by the MICR read head means, (b) into position to be printed upon and (c) into and out of the slot; (6) positioning means for positioning the negotiable instrument in the slot so that MICR information on the negotiable instrument can be read by the MICR read head means and for positioning the negotiable instrument in the slot so that the rear side of the negotiable instrument can be printed upon; (7) alpha/numerical keypad means for transmitting information to a CPU; (8) a CPU for receiving information from the alpha/numerical keypad means and the MICR read head means in order to communicate said information to a telecommunications system in order to transfer funds represented by the negotiable instrument from an account of the maker of the negotiable instrument to an account of the payee of the negotiable instrument; and (9) means for electronically connecting the point-of-sale negotiable instrument processing device to a telecommunications system.

Various optional features and preferred embodiments of this device may also be employed to advantage. For example, aside from the printer, the first compartment may also have a plurality of signal devices indicating the condition of a plurality of circuits contained in said device A keypad which is especially adapted for the customer's use (e.g., for entry of the customer's personal identification number) is preferably located outside the housing A keypad which is especially adapted for the retailer's use (e.g., for entry of the retailer's personal identification number may be located on, or outside of, the housing.

The slot for receiving the monetary negotiable instrument can be disposed between said first and second portions, and further comprise guide means which aid in receiving, locating, electronically processing and dispensing the check from the point-of-sale device. In a preferred embodiment of this device the check travels "through" the device (i.e., in one end of the slot and out the other); however, the check may also exit the device from the same part of the slot through which it entered. Other optional features may serve to identify the payee of said transactions and to establish the transaction selling price to the satisfaction of both the customer and the retailer.

This secured point-of-sale device also can be modified and/or augmented in several other ways to produce several other preferred embodiments thereof. For example, it could include one or more of the following features: (1) means to access a computer system maintained by a system of retailers using one central CPU with which this device is integrated, (2) means to access a computer system maintained by an issuer of a negotiable instrument such as a check and the like; (3) means to access an external communication system to identify a payor of a negotiable instrument (such as through the use of a personal identification number) and to perform an electronic funds transfer only with a proper PIN number; (4) telephonic means (such as a telephone headset and appropriate communication system) to communicate with the issuer of a negotiable instrument; (5) a standard 8 bit microprocessor capable of accessing 64 K bytes of memory; and means connecting a plurality of switching mechanisms to a microprocessor and upon any one of said switching mechanisms not being actuated, said mechanisms seeking an inoperable position; (6) a printing mechanism specially adapted for printing upon the rear side of a negotiable instrument such as a check, (7) an actuating mechanism cooperating with said printing mechanism for producing an imprinted copy of said transaction, (8) read head means for producing movement of said read head means with respect to said negotiable instrument as long as a code is being detected by said read head, (9) PIN identification number entry means connected to a CPU for receiving a PIN number, (10) means, including a CPU connecting the read head means and the PIN identification number entry means to the printing means, so that the printing means is actuated only when certain signals are compatible, (11) a data entry override means, and (12) a personal identification number module having a key tab matrix connected to a CPU, said key tab matrix is set to match a transaction amount to be recorded with the override means connected to the CPU for actuating said printing means.

It is also a preferred object of this invention to provide a secured point-of-sale device that is connected to a CPU that completes all transactions while the device is in a secured mode. It is yet another preferred object of this invention to abort any improper transaction while the device is in a secured mode.

These and other objects and advantages of the invention will more fully appear from the following, more detailed, descriptions, made in connection with the accompanying drawings.

DESCRIPTION OF THE PREFERRED EMBODIMENTS

Figure 1:
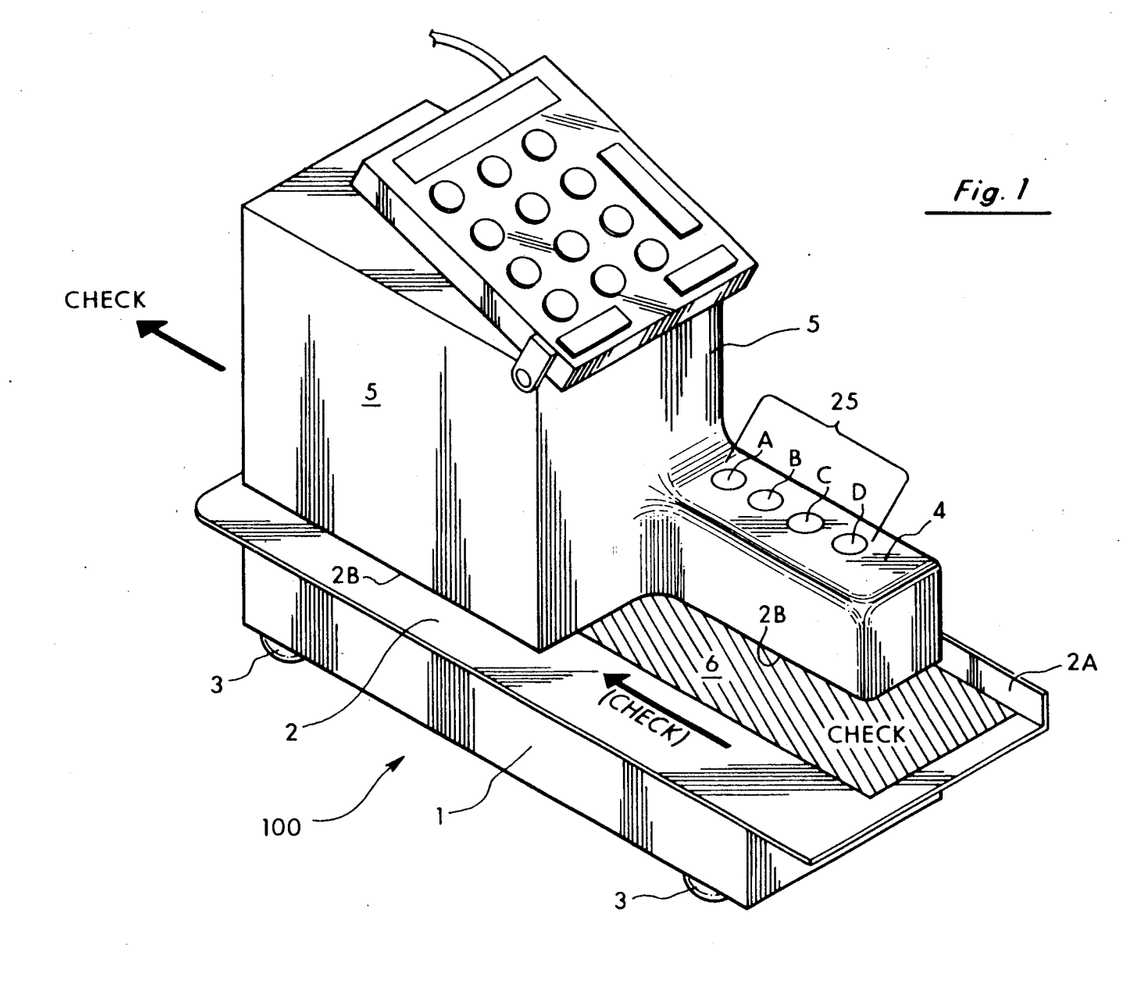
FIG. 1 is an isometric view of the point-of-sale device.

The "Point-of-Sale" (POS) check processing device of this patent disclosure is further described in FIGS. 1 through 7 wherein specific detailed items will be numbered by both a figure designation and an item designation as, for example, "1-3" or "1-6." Thus, the first numeral "1" directs the reader to FIG. 1 and the second numeral (following the hyphen) directs him to a specific item, i.e., item 3, item 6, etc., in FIG. 1. It follows that no two specific items will have the same number, however, the same item designation may appear in more than one figure. For example, the designations 1-6 and 6-6 each represent the same specific item, i.e., a check 6 to be processed by this device.

FIG. 1 shows point-of-sale device 100 in a "stacked" configuration wherein 1-1 represents a lower compartment or base which may or may not also act as a main frame for the entire device 100. Item 1-2 represents a table, located on top of the base 1-1, which serves as a guide for the check 6 being processed. Located above the base 1-1 (preferably located by a spacer means, e.g. a "vertical" side element), is an upper compartment 1-5. The upper compartment 1-5 may sometimes be referred to as a "first compartment" for purposes of this patent disclosure, while the lower compartment 1-1 may be referred to as a "second compartment". Item 1-4 represents an extended, tapered portion of the upper compartment 1-5 of said device 100. All parts of the device's housing (including 1-1, 1-4 and 1-5) are preferably constructed of high-impact resistant materials offering optimum durability and longevity. Metals and hard plastic are preferred construction materials. Similarly, all other portions of the device 100 and all associated peripheral key-pads, electronics housings, electrical wires and cables, electrical connectors and any or all mechanical or electrical components are most preferably constructed from materials resistant to normal physical wear and tear, common types of solvents and cleansing solutions, the effects of smog, sunlight, oxidation and the like, as well as to those petroleum products which might be encountered in gasoline service stations. In the same vein, all electrical circuitry are most preferably designed to be unharmed by local, high-energy radio frequency interference, highly inductive or magnetic fields such as those encountered near electric motor windings, electric solenoids and the like.

It is also important that this point-of-sale device 100 be protected against unauthorized intrusion for the purpose of affecting, manipulating, defeating, duplicating, counterfeiting or in any way circumventing the normal, authorized operation of the device 100, its peripherals or any part of the communication network(s) or system(s) connected to said device. Similarly, the central processing unit 16A (see FIGS. 2 and 6) of the device 100 also may be protected from, for example, x-ray penetration, infra-red photography, serial scanning and various types of remote electronic probing techniques known to the art. Finally, this point-of-sale device 100, as well as all its peripherals, also can be designed to be aesthetically pleasing in all respects with due attention given to color coordination, ease of operation and physical refinements.

FIG. 1 also indicates that the base 1-1 preferably will rest upon a system of sturdy, non-marking, non-skid feet 1-3 while the device 100 is in its standard, "right-side-up" orientation depicted in FIG. 1. It should be noted, however, that operation in an optional "lay-down" mode of operation may be more desirable in some cases. Feet to accommodate this lay-down mode are depicted as 4-3A. This laydown mode of operation follows from the fact that the retailer's (operator's) alpha-numeric keypad (see item 2-20), can rest on its normal mounting hinge axis, 2-21, or from another hinge axis rotated 90° as shown in 3-21A or 4-21A or from a "stand-alone" location inferred by FIG. 7. A rugged wire bundle control cable (2-22) of sufficient length connects a retailer's keypad 7-20 with the main housing (1-1) and thereby allowing the retailer a great deal of latitude in locating the keypad 2-20 for convenient use.

Figure 2:
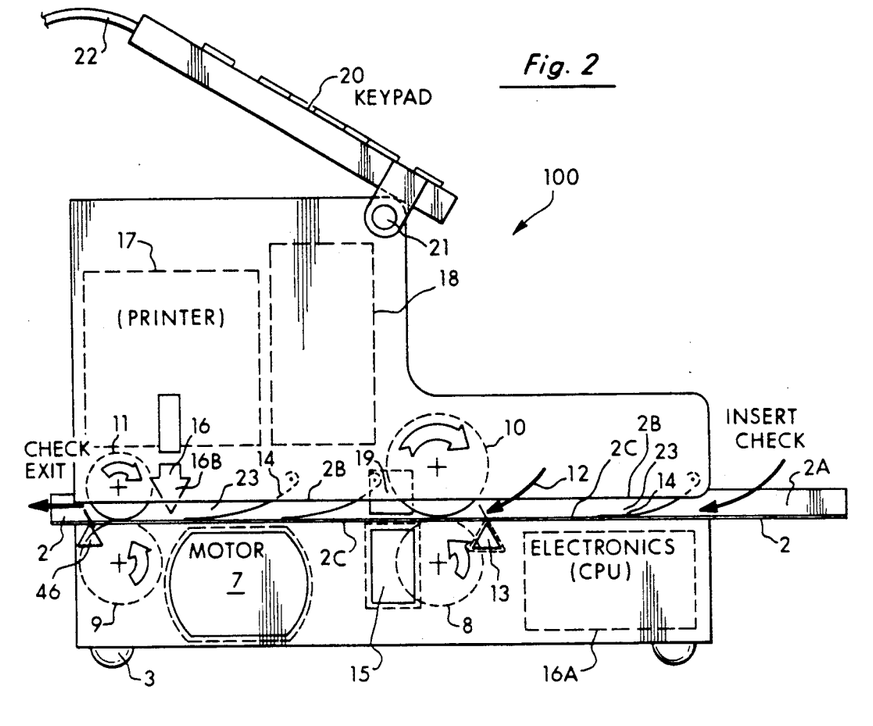
FIG. 2 is a cut-away side view of the device.

Item 1-6 depicts the customer's check (or any negotiable instrument utilizing the FED's MICR system) just as it is about to begin its functional travel into the point-of-sale device 100. In effect the check 1-6 is laid on a table 1-2 (2-2) having a perpendicular (and in this case a vertically perpendicular) rear guide surface 1-2A (2-2A). In effect the table 2-2 forms a substantial portion of the top surface of the base 1-1. A check receiver slot 2-23 is defined between the bottom surface 2-2B of the upper compartment 1-5 and the top surface 2-2C of the table 2-2 which, in turn, rests upon the top of base 1-1. The tapered or "nose" shape 1-4 of the upper compartment 1-5 is employed to facilitate "hands-on" assistance by the operator in placing worn, wrinkled, folded or damaged checks into the device 100. Damage to the MICR line area on the check, which renders it unreadable in the automatic mode of this device, may also be overcome by the operator who can visually read and manually enter the MICR information into the device via his keypad 2-20. In addition to housing certain hereinafter described check guide means such table 2-2 and its associated guide means 2-2A and certain check transport means and check "feed" apparatus hereinafter described, the housing nose 1-4 also may offer a convenient location for certain condition (prompt) lamps 1-25 which may conveniently indicate certain commands and operations of the device 100 and/or the network(s). These commands will be more fully described in later portions of this patent disclosure.

Figure 4:
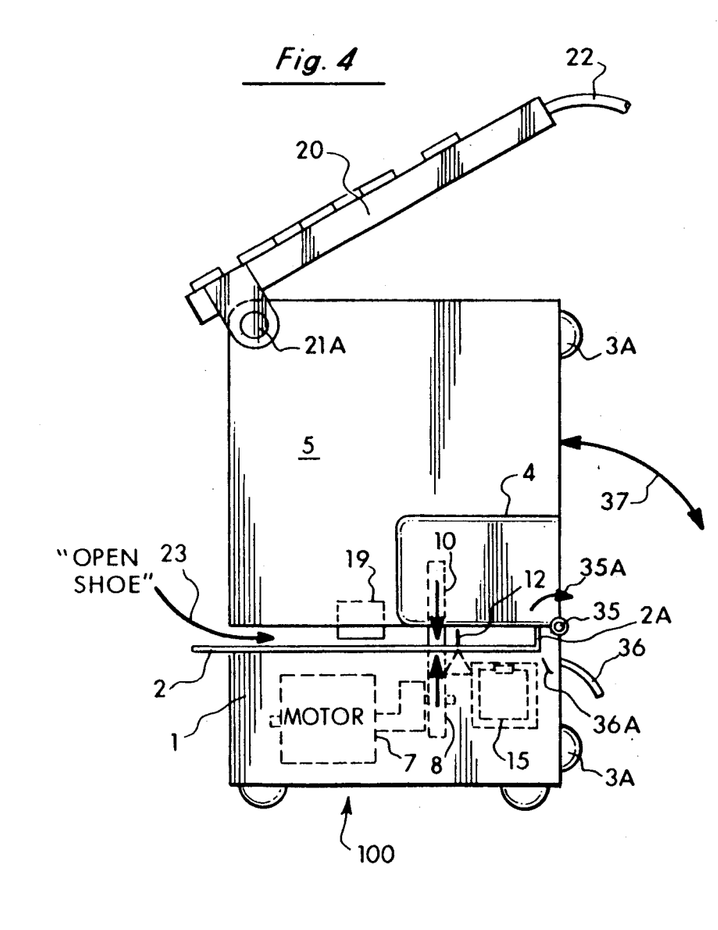
FIG. 4 is a front view of the device shown in partial cut-away.

FIG. 2 represents a side view of the device wherein an upper edge 2-2B and lower edge 2-2C of an "open"

slot 23 (see 4-23) are shown facing toward the reader. Such an open slot 23 can extend along essentially the entire bottom surface of the upper part of the case 2-5A and the extension portion 2-4. The arrows titled "INSERT CHECK" and "CHECK EXIT" in FIG. 2 depict a preferred direction of check movement through the device. The check could, however, also be: (1) inserted at the INSERT CHECK location, (2) processed and (3) exited in some other direction e.g., back out at the INSERT CHECK location or out the side opening of the slot 2-23.

Figure 6:
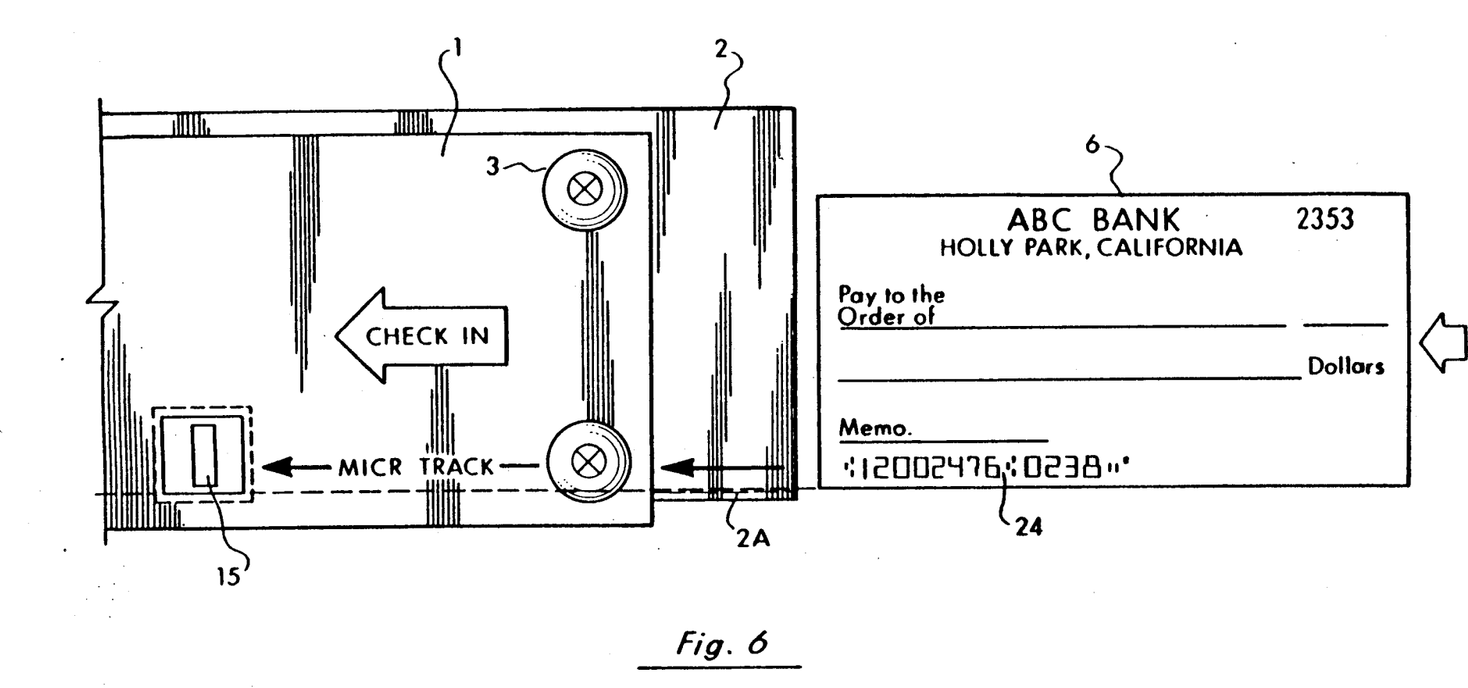
FIG. 6 is a bottom view of the device as it is about to receive a check.

It also should be noted that the Federal Reserve Bank's MICR printing regulations strictly dictate the type, size, location, tolerances, etc. of the MICR line (see 6-24) and the distance from the left edge and bottom of the check. However, since checks of different overall size are currently in circulation, an "open slot", feed through path, such as the one depicted in FIG. 2, is probably a preferred form of opening for receiving and processing checks of widely varying sizes.

As is better seen in FIG. 6, proper insertion of a check 6-6 is required to enable the MICR read head 2-15 to scan and interpret information 6-24 shown on said check 6-6. Under present FED regulations and/or custom wherein the MICR information is printed on face side of the check or other negotiable instrument, the operator would place the check inverted (upside down) on the (2-2) guide table taking care that the bottom edge (nearest the MICR line) touches a vertical edge (see 4-2A, 5-2A or 6-2A) of the table 2-2. So placing the check in the device 100 insures that its read head 2-15 will be the correct distance from the bottom of the check to properly "scan" or "read" the MICR line 6-24 as it is drawn across the read head 2-15. Although it has been stated that the Federal Reserve Bank's MICR Printing Regulations strictly dictate the height of the 6-24 MICR line above the bottom edge of the check, provisions have been made in order to tolerate small variances in this height allowing for worn edges, water damage, etc.

As the check is first manually introduced into the machine, it preferably automatically passes under the first of several guide means 2-14 (shown here as small springs) to promote the check's smooth and unimpeded progression across the MICR head 2-15, under and through a printer head means 2-16, and finally on to a smooth exit from the device 100, preferably, at the arrow designated "CHECK EXIT." When the check 6-6 has been moved far enough into the device 100, it preferably encounters and then trips a trigger means 2-12 causing contact (or lack thereof) of a switch means 2-13 and thereby alerting a CPU and preferably alerting an on-board central processing unit (CPU) to begin a programmed transaction cycle of the device. This triggering of switch means 2-13 instantly initiates one or a series of (pre-programmed) CPU functions. These functions may include, but are not limited to, the following operations:

1) The CPU 16A memory stands by to receive and store (most preferably, for the duration of this transaction only) all necessary MICR information printed on the check (6-6).

2) The CPU 16A stands by to interpret (if necessary) information fed to it by the MICR head 2-15 and to convert said information into useable data for the CPU's memory.

3) The CPU 16A signals a motive means such as an electric motor 2-7 to operate a document "feed" means such as wheels (2-8 and 2-9) and thereby drawing the check 6-6 across the MICR read head 2-15. The MICR data (see 6-24) is read and stored; a MICR "stop code" (see 6-24 and 6-24B) could be employed to cause the CPU 16A to stop motor means 2-7 at appropriate times in the processing of said check.

Figure 7:
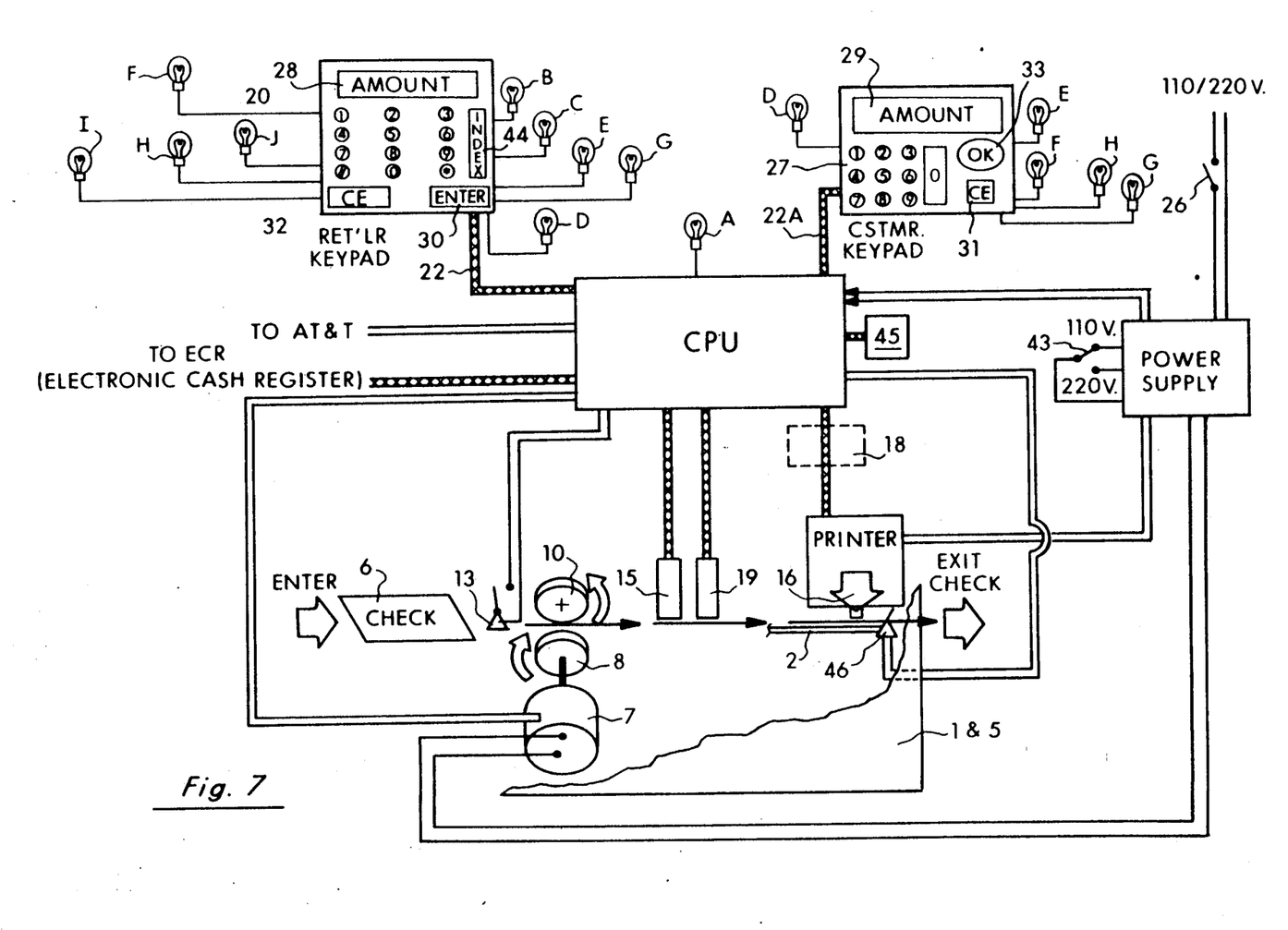
FIG. 7 is a diagrammatic presentation of the device, emphasizing the functions of the keypad devices used by the retailer and the customer.

4) An "ENTER PIN" prompt lamp 7-20D and 7-27D preferably lights and the CPU 16A stands by to receive and store (again, for the duration of this transaction only) the customer's personal identification number (PIN) which the customer preferably enters at a keypad 7-27 which is, preferably, separately provided for the customer's private use. A second or retailer's keypad 20 is also depicted. As the customer keys in his appropriate PIN, it is preferably displayed digit-for-digit/stroke-for-stroke at a customer's display window 7-29 depicted on keypad 7-27. Thus, if the customer, while watching his PIN entry on display window 7-29, notices a mistake, he can cancel his entry by pressing a "CANCEL ERROR" button, 7-31 (located on keypad 7-27), and begin again. When the customer has entered the proper PIN digits on the keypad, for example four digits, "OK the PIN" prompt lamps 7-27H and 7-20H will preferably light; thereafter the customer pushes an "OK" button 7-33, located on the customer's keypad 7-27.

To this end, the CPU 16A could be programmed to recognize a four digit (for example) PIN entry as a "complete" PIN entry and to automatically "accept" it as the customer's preferred entry. More preferably, however, to allow the customer sufficient time to visually verify the correctness of his PIN entry and consequently the chance to change and/or correct it even after the final digit has been entered, the CPU 16A means can be programmed to allow a time interval such as for example a three second (interval variable and programmable) delay period between the time of entry of the final PIN digit and the time when the CPU 16A means "accepts" it as the customer's desired entry and consequently lights the "OK THE PIN" prompt lamps, 7-20-H and 7-27-H. The CPU 16A could also be programmed to immediately light the "OK THE PIN" prompt lamps, e.g., 7-H following the entry of the final digit to help draw the customer's attention to his task of visually verifying the PIN at 7-29 and still allow the customer the prescribed time delay for a possible correction of the entry. By this means the customer could recognize a mistake in his pin entry, even after all digits have been entered, and cancel it for correction by pressing the 7-31 "CANCEL ERROR" button and begin again. Another embodiment may include a case where the CPU 16A will not accept the PIN entry unless or until the customer presses the "OK" button 7-33 within say one minute, for example, time limit (here again, the time limit is variable and programmable). In this case the CPU 16A would leave lit the "OK THE PIN" prompt lamps 7-20H and 7-27-H until either the customer presses the "OK" button 7-33 or the time limit is reached. If the time limit is reached before the customer "OK's" the PIN, the CPU 16A most preferably will automatically abort the transaction.

Still another embodiment may be a case where the "ENTER PIN" lamps 7-20-D and 7-27-D prompt the customer to enter his PIN. When the desired PIN is entered, the customer would press a "ENTER PIN" button 7-30A whereupon the CPU 16A would accept the entry, extinguish said "ENTER PIN" prompt lamps and light the "OK THE PIN" prompt lamps 7-20-H and 7-27-H calling on the customer to press the "OK" button 7-33 which would cause the CPU 16A to recognize the PIN as valid, place it into the appropriate 16A memory means for all described and intended functional uses. In any of the above embodiments, when the entered PIN is "OK'd" by the customer, and received and stored by the CPU, the prompt lamps at 7-20-D and 7-27-D ("ENTER PIN") plus 7-20-H and 7-27-H ("OK the PIN") lamps will preferably extinguish. Under these operating circumstances, the customer's secret PIN number is not displayed on the retailer's (operator's) 7-28 display window.

5) An "ENTER CHECK AMOUNT" prompt lamp 7-20-C, preferably lights at the retailer's keypad (2-20, 7-20) and the CPU 16A stands by to receive and store (again for the duration of this transaction only) the face value, e.g. the $8.16 shown as 6-24D of the check 6-6 which is entered by the retailer on the retailer's keypad 7-20. As the retailer keys in the check amount, it is displayed digit-for-digit/stroke-for-stroke at a retailer's display window 7-28 shown on retailer's keypad 7-20. If the retailer, while watching his check amount entry coming up on display window 7-28 notices a mistake in check amount, he can cancel his entry by pressing a "CANCEL ERROR" button 7-32 (located on the retailer's keypad 7-20), and begin again. After the retailer has keyed in the proper amount of the check, he then presses a "ENTER" key 7-30 (also located on retailer's keypad 7-20, 2-20); this extinguishes an "ENTER CHECK AMOUNT" lamp 7-20-C. The check amount 6-24D is then displayed on the customer's display window 7-29 and "OK THE AMOUNT" prompt lamps 7-20-F and 7-27-F respectively light on the retailer's keypad 7-20 and on the customer's keypad 7-27. The check amount 6-24D remains displayed on the retailer's window 7-28. After the check amount entered by the retailer is "OK'd" by the customer's pushing of an "OK" (amount) button 7-33 located on customer keypad 7-27 and the CPU 16A has received and stored the "OK" command, the "OK THE AMOUNT" prompt lamps 7-20-F and 7-27-F are extinguished. The CPU 16A is now ready to access the communication means to the (financial) network(s) and complete the prescribed electronic funds transfer. The CPU 16A may also interface with electronic cash registers, local area networks (LANS), or other peripheral gear at this time as desired.

As noted above, once switch means 2-13 is engaged, the check is drawn or pulled into the device 100 by the action of a motive means such as electric motor 2-7 which mechanically drives (via drive means not shown, but known to the art) one or more feed means such as "feed wheels" 2-8 and 2-9. Said feed wheels 2-8 and 2-9 touch and in turn drive respective idle or "slave" wheels 2-10 and 2-11 and thereby rotate them in the opposite rotational direction. Operating in concert, the counter-rotating action of said document feed wheels 2-8 and 2-9 propels the check 6-6 through the device 100 at appropriate speeds, times and distances which are controlled by the CPU 16A or other appropriate control means known to this art.

Figure 3:
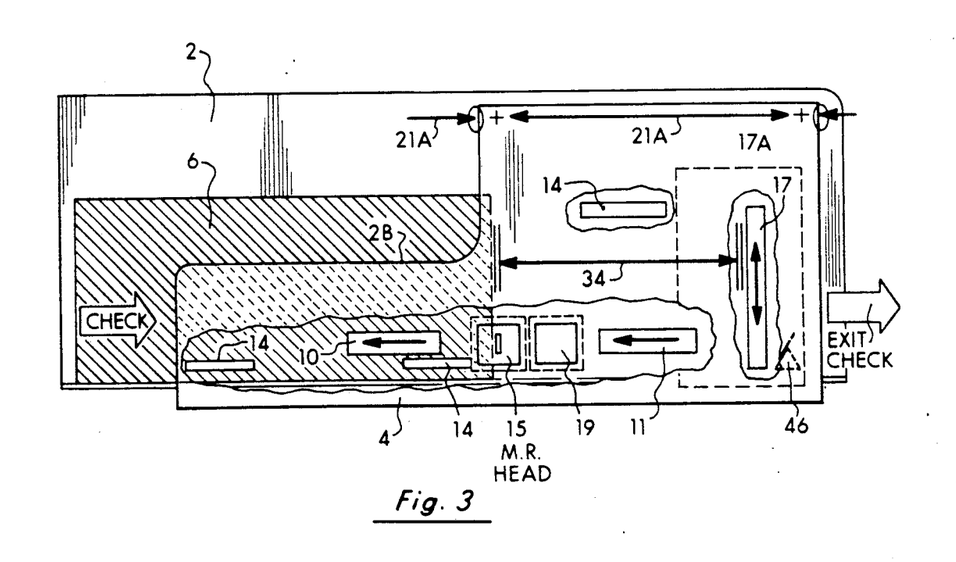
FIG. 3 is a top view of the device in partial cut-away.

A document printer matrix head 2-16 is shown in association with an associated printer head drive means 2-17 which propels the matrix printer head in a preferred, customary lateral "back and forth", i.e., in the direction of arrow 3-17, field of motion defined, by the region depicted as 3-17A. Item 2-18 generally depicts a printer control electronics system (if necessary) which controls the printer head drive means 2-17 and printer matrix head 2-16. The printer head 2-16 may or may not interface and interact with the CPU 16A, the document feed means (2-7, 2-8 and 2-9 with 2-10 and 2-11) and/or certain commands such as may originate from associated electronic cash register(s), local area network(s) (LAN), financial network(s) services and/or financial institutions. The region of motion 3-17A, in cooperation with the described document feed means, should be adapted to allow for clear and accurate printing (by printer head 2-16) on the check or other negotiable instrument (preferably on their back surfaces) in all forms, fashions and locations required by the FED or other regulatory agency. For example the information printed may include, but not be limited to:

1) The payee's legal printed endorsement in its correct location as mandated by the FED's Reg. CC. Endorsement example:

FOR DEPOSIT ONLY

METROPOLITAN STATE BANK OF IDAHO

ABC HARDWARE COMPANY

2) Use of bold and clear letters, the exact amount of funds transferred from the payor account to the payee's account as entered by the retailer on keypad 2-20 (7-20) AND "OK'd" by the customer on his "OK (the amount)" button 7-33. ALSO, in equally bold letters next to the amount transferred, the fact that the check is "truncated" or cancelled at the point of sale by this device. Example:

FUNDS TRANSFERRED $18.07

CHECK CANCELLED—POS

19:08 hrs.—19Jun1989

3) Use of all such language, numbers, dates, codes and data as is, or may be, required by law and the Federal Reserve System's Rules and Regulations. For Example:

PAY ANY BANK

P.E.G.

Spruce Nat'l Bank

Bennet, Idaho 71838-4066

19 June 1989

Again, it should be noted that all printing on the check such as the endorsement(s), date(s), amount, etc. and other data with regard to content and location or placement is strictly regulated by the U.S. Federal Reserve Bank System and its Board of Governors including Regulation CC as it may change from time to time.

This device 100 may or may not utilize "Stop Codes" (see for example items 6-24 and 6-24B) contained within the FED's MICR line, 6-24, to control the "Start/Stop" mode(s) of the document feed motor 2-7. It should also be appreciated that by "keying" from these "stop codes"—using them as bench marks of location—it is possible to locate the desired "target zone" for the correct placement of regulated printing on the back side of the check. Such stop codes, integral parts of the FED's MICR system, may enter the device's CPU 16A along with all other MICR data, and are, in fact, a part of that data. However, the CPU 16A also can be programmed to "under-shoot" or "overshoot" the stop code locations for the sake of the printing and document feeding processes.

FIG. 2 also depicts a magnetic stripe ("magstripe") read head means 2-19 which is shown as an optional feature in anticipation of any future use of a magnetic strip, much the same as the mag-stripe found on the back of common credit/debit cards, to contain, capture, record or disseminate any such transaction information or identification means as may be mandated by laws, conventions, convenience and/or regulation. This magstripe read head means (see for example items 2-19, 3-19, 4-19 and 7-19) also may be replaced by and/or augmented with an optical read head means to optically scan and retrieve printed data employing "Optical Character Recognition" (OCR) technology and/or an appropriate read head to capture "Universal Product Code" (UPC) data printed on the check or other negotiable instruments processed by this device 100. Again such additional read head means are optional. Moreover, they could read the face of the check as well as its rear side as suggested in FIG. 2.

FIG. 3 depicts a top view of the device 100 showing certain other preferred embodiments. For example, it shows the preferred direction of the check 6 as it passes across the MICR read head 3-15 (and/or optical or an optional mag-stripe head 3-19), through the printer and out of the device 100. In a less preferred embodiment, the check could be inserted as shown in FIG. 3, processed and then be ejected back to the place where it was originally introduced. Item 3-14 indicates a preferred guide means strategically located to minimize paper jamming of the documents and any adverse reaction of said documents to the printing process. Again, item 3-17A generally shows the region or reciprocating field of motion of the printer head 2-16 which preferably moves perpendicularly to the travel of the check 6-6 in the manner suggested by the printer head arrow 16-B shown in FIG. 2. Item 3-34 depicts a prescribed distance between the MICR read head 3-15 and the printer matrix field 3-16A. Use of such a distance 3-34 insures that after the check 3-6 trips trigger means 2-12 (thereby starting the document feed process), all necessary MICR information is read by the MICR head 3-15 before the MICR "stop code" stops the document feed process. Generally speaking the "stop code" can be used to halt the check's travel beneath the print head means 2-16 at or just before the location of the first line to be printed. To optimize motion efficiency, it is preferred that the check 3-6 will not have to back up or reverse its direction of travel, and travel minimum distances (if any), before the printing process begins. The actual printing process most preferably will resemble any common, high quality ticket printer in that the matrix will print while moving in either direction and the document will advance line by line as necessary by means known to the art.

It should also be noted that, as of the date of this patent application, actual printer control may or may not be accomplished totally on-board within the device itself, but may in fact be partially or wholly dictated by financial network services and/or the financial institutions connected thereby. Some determining factors include financial security of the entire system, available and/or required network "connect time", software availability (for high speed printer control and high speed encryption/decryption of sensitive data), Federal Reserve regulations (if any) and legal restraints (if any), among others may dictate these features. As software and signal processing develops allowing shorter and shorter network "connect" times, the CPU 16A and printer buffer may receive the necessary transaction data to print the check faster than the printer can transfer it to the check. At that time, total check truncating control may or may not be a totally on-board function of the device.

FIG. 3 also shows an alternative hinge mount location 3-21A, e.g., alternative to the hinge mount depicted as 2-21 for the retailer keypad 2-20. This alternative location 3-21 could be used when the device is operating in a "lay-down" position. In such a position, the check would be inserted from the left and progress to and exit from the right. Again, this lay-down position may be beneficial in certain applications where the user has limited operating space (see for example, FIG. 4 which shows the 2-20 keypad attached at such an alternate 3-21A (4-21A) site).

FIG. 4 represents a front view of the device 100; it particularly demonstrates an open slot or "open shoe" (generally depicted by item 4-23) whose upper edge 2B and lower edge 2C were described earlier in this patent disclosure in conjunction with FIGS. 1 and 2. FIG. 4 also shows how hinge system 4-35, which allows the upper housing and components attached thereto to be conveniently swung up and pivoted away (on the radially direction generally depicted by arrow 35A) in order to provide physical access to the interior components exposed by this action. Item 4-36 shows a release means by which the operator or service person unlocks or releases the upper portion(s), e.g., upper compartments 4-4 (and/or 4-5), swinging it open to clear paper jams, adjust or service interior components or to access any seldom used data entry means which may be located within the housing(s) 1-5 and/or 1-1. Associated with the release means 4-36 is an appropriate switch means 4-36A which preferably indicates to the 16A CPU that the release means 4-36 has been activated. Said activation of the release 4-36 and subsequent simultaneous activation of the release switch 4-36A, 7-36A most preferably causes the CPU to automatically abort a transaction if said transaction has not already entered the network means.

The MICR 4-15 read head as well as the document feed means 4-7, 4-8 and 4-10 are depicted in their respective relative positions to the table 4-2 and its vertical guide edge 4-2A. When a check is inserted in the described manner, it will be positioned in its proper functional alignment with certain important operational elements of the device, including the trigger means 2-12, the document feed means 2-8, 2-9, etc., the MICR read head means 4-15, as well as any anticipated magstripe read head means, and/or optic read head means generally shown as item 4-19. FIG. 4 also shows the counter rotating motion of drive wheel 4-8 and idle wheel 4-10 which cause a pinching and drawing action which propels the check or other negotiable instrument through the device 100.

Figure 5:
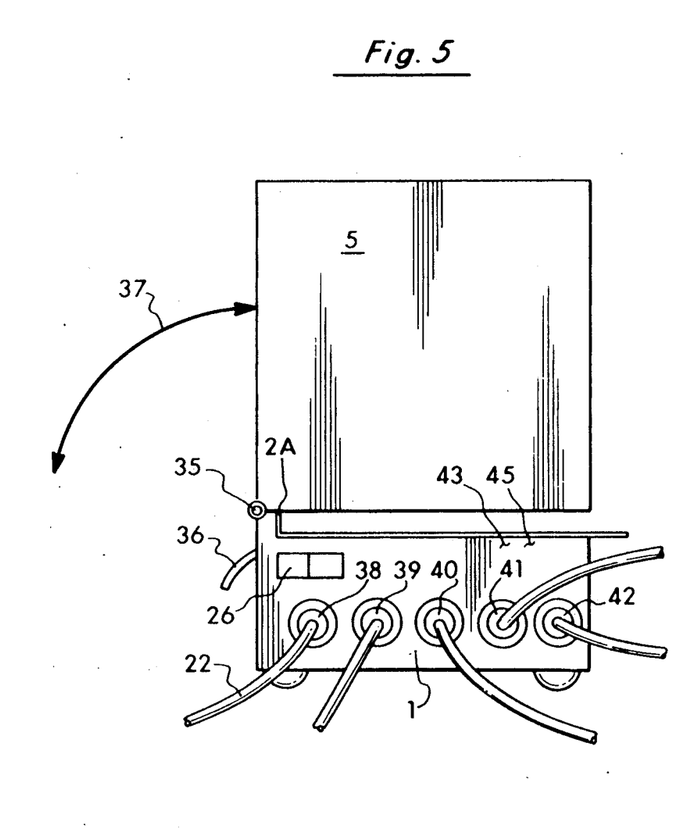
FIG. 5 is a rear view of the device.

FIG. 5 is a rear view of the point-of-sale device 100 wherein arrow 5-37 depicts the rotational path taken by the upper housing 5-5 following release of the release means 5-36. A main power switch 5-26, controls the flow of AC current to the device and a condition lamp (see 1-25-A) may indicate, when lit, the presence of said current. Electric cable entry points are shown as 5-38, 5-39, 5-40, 5-41 and 5-42; each may or may not utilize suitable connectors or plugs allowing connection to components or functions previously described. For example, the retailer's (operator's) keypad 7-20 can be connected via suitable cable and connector means to the device's lower housing 5-1 at cable entry point 5-38. In like fashion, the customer's (PIN entry) keypad 7-27 can be connected at cable entry point 5-39. The device connects to a network means (e.g., AT&T and/or LAN) at cable entry point 5-40. Suitable AC power enters at cable entry point 5-42. Cable entry point 5-41 depicts an optional but anticipated connection to an electronic cash register or similar device. The device may or may not operate on suitable 110 volt and/or 220 volt power requiring a voltage selector switch 7-43, which may be located inside the lower 1-1 housing as is generally indicated by 5-43.

FIG. 6 shows a (partial) bottom view of the device 100 wherein the preferred insertion and direction of movement of the 6-6 check or other suitable negotiable instruments is illustrated. The check 6-6 is inserted upside down as shown using the table 6-2 and vertical guide 6-2A to help insure proper alignment of the MICR line 6-24 with the MICR read head 6-15. The table 6-2 and vertical guide means 6-2A may at the same time align other forms of readable transaction and/or identification data with a proper read head such as previously depicted as item 2-19, 3-19, and 4-19. It is anticipated that such other forms of transaction data will either be magnetic in nature requiring a suitable "magstripe" similar to that found on a common credit/debit card and/or of an optically scanned ("read") type similar to the common "bar code" (UPC) or one requiring an optical character recognition (OCR) technology. However, regardless of the form of such additional operations, transactions and/or identification, the read mechanism depicted as item 2-19 and 7-19 will be of a type to scan and read it and it will be processed with the aid of suitable software so that the CPU 16A can effectively decipher and process it in ways well known to the art.

FIG. 7 is a component block diagram of this device which particularly illustrates the retailer's alphanumeric keypad 7-20 and the customer's alphanumeric (PIN entry) keypad 7-27. Certain numbered items depicted on FIG. 7 have been heretofore discussed and others will be more specifically described in later portions of this patent disclosure.

Since it is anticipated that this device 100 and its associated components (if any) will interact with a number of financial networks and they in turn with a number of banking institutions, many obvious, and some proprietary security precautions, may be taken to promote the security interests of those involved. The retailer's keypad 7-20 and the customer's keypad 7-27 will play an important role in these matters. For example, use of a personal identification number (PIN) by the customer at the time of point-of-sale transaction is an obvious example of such a precaution. Proprietary encryption and decryption methods also may be employed to "scramble" or encode financial data transmitted to and from certain locations on the network system. Each banking institution and/or each network participant may or may not have its own encryption/decryption methods and/or other security requirements. Therefore, it would not be possible to describe future developments in detail in this area, that is as they relate to the point-of-sale check processing device of this patent disclosure. However, it most probably can be said that at that point in time, as now, after each transaction is completed, and after the network communications connection has been dropped, the CPU's memory means will most probably completely "dump" (erase from memory) all data that was required for the previous transaction. Thus, when not in use between transactions, the device will, most probably, not contain means or data which can be used to transfer funds. Hence, the device will begin each transaction with a clear memory ready to receive MICR and PIN information as well as the entered check amount.

Before describing a typical verification/transaction/print cycle of this device, a few background conditions should be understood. First, the "MICR" (magnetic ink character recognition) line 6-24 was developed to allow high speed, computer controlled processing of checks by the twelve Federal Reserve Banks (and their branches) and the various Automated Clearing Houses throughout the country. The MICR characters themselves are exactly what the name implies, "magnetic," thereby causing electric current pulses in a circuit when "read" by a proper electronic read head such as the one generally depicted herein as MICR read head 2-15. The Federal Reserve Bank has published many regulations and booklets describing their MICR system. Suffice it to say for our purposes that each check 6-6 has a unique MICR number 6-24 enabling a central computer(s) system to identify, sort it, and process it as an individual item. The characters in the check's MICR line identify the customer's bank and the FED district in which it is located, his check account number as well as the check's serial number. Specifically, from left to right, the MICR line identifies:

1) The first two digits identify the bank's Federal Reserve District.

2) The third digit identifies the Federal Reserve Office (head office or branch) or a special collection arrangement.

3) The fourth digit shows the bank's state or a special collection arrangement and completes the check's "routing symbol."

4) The next four digits are the bank's "Institutional Identifier." Each bank has its own identifier.

5) The next number is the "check digit." This number, combined with the first eight digits, verifies the routing number's accuracy in computer processing.

6) The next group of numbers (digits may vary) identify the customer's account number.

7) The next group of numbers (digits may vary) identifies the customer's check serial number.

8) Cancelled checks that have passed through the FED's (and/or ACH) collection system as it exists at the date of this patent application will have a final group of numbers located at the right (under the signature) indicating the dollar amount of the check. This dollar amount is printed by the first bank receiving the check.

It should also be understood that the personal identification number (PIN) with which the customer identifies himself or herself to the appropriate (and necessary) computer(s) is normally a matter between the individual customer and his bank since each bank may insist on its own means of generating and protecting the PINs. In like manner, each bank may insist on its own encryption/decryption means to protect its own computer (and/or LAN) from unlawful entry. In these cases, the individual bank would be responsible for that software/hardware which produces a secure interface with the network(s). In turn, the financial network(s) may insist on its own security arrangements and would assume responsibility for fulfilling its own hardware/software needs. Further, it is assumed that banking institutions wishing to participate in a national EFT or "check debit" network will voluntarily make prior arrangements with their customers in the event that any EFT check transaction places the customer's account in a "non-sufficient funds" (NSF) status. Such arrangements may be similar to those made between banks and their debit card customers or may take the direction of automatic loans, sometimes called "overdraft protection", for the amount overdrawn by a customer's debit check transaction. Upper limits of said overdraft protection and the number of days of allowable "float" (a time period between the customer's writing of a check and his depositing into his account of sufficient funds to "cover" the [NSF] check he has written) afforded the customer again are matters between the bank and its customers. Limiting overdraft protection and "float" time is merely a matter of computer programming at the bank. It is anticipated that the topics discussed briefly in this paragraph may become the target of existing and/or new Federal Reserve regulations and/or local, State or Federal legislation similar to that body of debit card law which already exists.

However, it should be understood that before the device 100 of this patent disclosure can function automatically as designed, the retailer must first make suitable arrangements with a financial network and/or carrier. Second, the retailer must, upon taking delivery of this device, "program" or enter his security "password" into the device's CPU and then the desired payee account number. This account number may or may not be (subject to applicable law and regulations) the same MICR information as is presently found on a standard check used to withdraw funds from that account. It is anticipated that the retailer may wish to deposit EFT check credits to another bank account not associated with check withdrawal. In any case, the correct account number must be entered along with the remainder of the necessary MICR information allowing the network to "locate" the desired payee account. If, for example, a retailer purchases a machine and wants the debit check deposits (EFT credits) made directly to his company's checking account immediately at each check transaction made with this device, he may easily do so. In such case the retailer would first activate the housing release 4-36 (5-36) and swing open the upper housing 1-5 (4-5) thereby gaining access to the switch means 7-45 (5-45) located inside the upper and/or lower housing(s). He would then enter, using a proprietary series of alpha-numeric entries at keypad 7-20 in conjunction with switch means 7-45, a (personal and secret) "password" of his choosing to activate the programmable portion of the device's CPU 16A; this password limits access to the CPU 16A to inhibit unauthorized reprogramming of any such data as might be contained therein. Next the retailer would enter a "retailer identification number" using a series of keystrokes at retailer keypad 7-20 in conjunction with switch 7-45. This retailer identification number (RIN) identifies this retail location to the network and consequently to the appropriate banks. The RIN also would be recorded at the retailer's bank (payee's account location) to provide various means of security and to connect the RIN with a proper name and address of the retail establishment to be printed on the back of the check for endorsement, etc. In the same manner, using keypad 7-20 with 7-45, the retailer enters his payee account number and its (bank) location by entering the appropriate FED MICR data for this account such as that data outlined in subparagraphs 1 through 5 of the MICR line description 6-24 discussed previously. In like fashion, using the same keypad 7-20 and switch means 7-45, the retailer will program the correct network and/or carrier access codes to allow this device to connect to the network and subsequently to the proper financial institutions. The retailer now terminates programming of the device's CPU 16A and closes the housing to begin normal operation. It should be stated that various methods of encryption and decryption of the transaction data and/or utilization of the PIN's, RIN's, accoui t ·mbers, etc. also would produce an added measure ct s curity for all stations and parties involved, and said step. may be partially or wholly initiated and employed within this device at the point of sale.

To better understand the actual transaction process executed by this device, certain other preferred features, functions and conditions also should be noted; these may include:

1) A "system fault" condition lamp such as the one depicted by 7-20-B (located on keypad 7-20) could indicate one or more of the following conditions: (a) The device is unable to access or establish contact with the network or communications carrier, or; (b) The financial network is unable to access or establish contact with one or a number of the required or appropriate financial institutions in order to complete the transaction, or; (c) the device cannot receive necessary data from either the network (carrier) or any number of necessary financial institution(s) to complete the transaction. Should such a system fault be present, the CPU 16A would most preferably erase or "dump" all entered transaction data; the customer's MICR information (from 6-24), the customer's PIN number and the check amount. The CPU 16A also would direct the document feed means (2-7) to expel the check or MICR document from the device by activating the mechanical means for expelling the check. The motor 2-7 will continue to operate (expulsion mode) until an "exit switch" means 2-46 (3-46, 7-46) indicates (by a proper contact or lack thereof) to the CPU 16A that the document is no longer present, and in fact has exited the device, at which time the CPU 16A would stop motor 2-7. The same transaction can be re-attempted immediately.

2) A "clear paper" prompt lamp 7-20-I could instruct the retailer or operator to open the device (using 4-36 release means) and physically clear or remove any fouled or otherwise impeded document. Lamp 7-20-I can be lit by the CPU 16A after a MICR document has entered the device (indicated by the switch 2-13) but the CPU 16A has not received the expected MICR information and/or the document has not properly activated the "check present/exit" switch 2-46 which indicates that the check 6-6 has not reached its proper position directly under the printer head means 2-16. The retailer could attempt the expulsion or "clearing" process by activating an "index" switch 7-44, (located on keypad 7-20) which will in turn activate feed means 2-7. If the attempted "indexing" does not clear a fouled check, then the retailer must open the housing by utilizing release 4-36. Preferably, either the act of pressing the indexing key 7-44 or releasing release means 4-36, and thereby activating 4-36A switch means, will cause the CPU 16A to dump transaction data and the entire transaction cycle must begin again. This "indexing" (momentary) switch 7-44 may also be useful if, after entering the check into the device to start a transaction, the retailer has forgotten the customer's check amount. Since the CPU 16A should not accept transaction data until the switch 2-13 has been activated, the check amount can only be entered after the check has entered the device 100. This would help to insure that the funds being transferred are leaving the account indicated by the MICR line 6-24 held within the device at the time of the transaction. If the "check present/exit" switch 2-46 or the release 4-36 and switch means 4-36A used to notify CPU 16A is prematurely activated before the entire transaction cycle has been completed, the transaction is preferably aborted and the CPU 16A dumps transaction data and expels the document by activating motor 2-7.

3) A "transaction completed" indicator lamp is located on the retailer's keypad 7-20 and is shown as item 7-20-E. "Transaction completed" is also indicated by an analogous lamp 7-27-E on the customer's (PIN) keypad 7-27. These "E" condition lamps are to notify both the retailer and the customer at the earliest moment that the amount of the check, as entered by the retailer at keypad 7-20, has been electronically transferred from the payor's to the payee's account. This amount can be printed on the back of the check as described elsewhere in order that the customer (payor) can verify the figure.

4) An "amount declined" indicator lamp located both on the retailer's keypad and the customer's keypad is shown as 7-20-G and 7-27 G respectively. This 7-20-G condition lamp indicates either/or: (a) The customer has exceeded his checking account balance, and/or; (b) The customer has exceeded his special arrangement with the bank to pay non-sufficient (NSF) (debit) check demands by "overdraft protection" in whatever form that may take, and/or; (c) The account indicated by the 6-24 MICR line on this particular check (within the device) cannot be reached by the network(s) being used. It is anticipated that the banking community will cause to be printed on the checks of participating customers a small symbol showing which checks can be used in this device. A small symbol of such a type would alert the retailer before accepting the check of the potential, or lack thereof, of transferring electronically the funds represented by the offered check. It is also anticipated that another condition lamp, shown as item 7-20-J, will show the retailer that the check he (the retailer) has inserted into the device is one of a non-participating customer and/or bank and will help avoid any embarrassment at the point of sale for all concerned. This additional lamp, said 7-20-J, will merely indicate that the check in question is that of a non-participating customer and/or bank and will not mean that the check is in any way suspect.

5) For the retailer's convenience, an optional "cash ticket" could be easily printed by this device by placing a "no-carbon-required" slip of paper of an appropriate size against the back of the check before inserting the pair into the device. Special paper (e.g., known to the art as NCR paper) may be on the back of the check in order to allow for proper MICR scanning of the device and in order to allow the "no-carbon-required" page to print the necessary information on the check. The resulting NCR page could then be inserted into the retailer's cash register drawer to represent the (EFT'd) debit-check sale as a written record of a "cash" item.

6) Provision can also be made (e.g., at 5-41) for an appropriate connector and cable means allowing essential and/or useful digitized transaction data to pass to and from common types of electronic cash registers. One example of said data communication would be the automatic entry into the retailer's (appropriate and suitable) electronic cash register by this device's CPU means of the "amount tendered" by the customer's check located within this device (see for example the note at the end of this paragraph). The actual "amount tendered" by the check will be the face value of the check as entered by the retailer at 7-20 (as described elsewhere) and "OK'd" by the customer's keystroke at 7-33. However, the "amount tendered" data would not pass from this device's CPU to the (electronic) cash register until after the funds represented by the check had, in fact, been electronically transferred (via financial network means and operations) to the payee's account. At this point the funds transferred from the payor to the payee (to payee's account) amount to "cash tendered" and/or "cash paid" and would require all appropriate treatment as cash.

After the device's CPU 16A had been notified (by the financial network means) that the amount of funds represented by the check had been transferred, the CPU would then electronically enter into the cash register the "amount tendered" yielding the same results as if the retailer had entered it in his customary manner into the register. The retailer's cash register then would proceed in its normal routine by printing the invoice slip (or customer's ticket) and its own running tally means making note of this transaction's total value of purchase, appropriate tax(es), amount tendered, amount of change paid out, etc. From the moment this device's CPU received the appropriate notification that the funds (face value of the check) had been transferred to payee's account, it would resume its normal, prescribed routine as stated elsewhere.

Note: a scenario wherein the customer tenders a check for an amount smaller than the amount of the sale and then tenders the remainder in cash, may or may not require different procedures. Recognizing that different electronic cash register manufacturers' devices and systems may each necessitate its own software protocol, formats, etc., individual software for each cash register model/make/type may or may not be developed by said manufacturers facilitating a proper working interface with this point-of-sale device. Hence, at this time, applicants can only suggest that resolving said scenario would require software allowing the retailer to enter the amount of tendered "cash" in his usual fashion on his register's data entry keypad, and that said cash register software would then add the (cash) amount to the amount tendered by the customer's check via said check device's CPU means. This procedure would yield an overall "total amount tendered" to be recognized by the cash register and the retailer could proceed normally with the transaction. In this particular case, the customer's check would be returned to him verified, endorsed, EFT'd, printed and truncated (processed and cancelled via the financial network means and operations) along with his copy of the cash register receipt (ticket). Thus, the customer would receive a written account of the complete transaction and the retailer's (electronic) cash register means would contain the same information in its own format.

7) A preferred embodiment of this device also would employ and utilize an appropriate and suitable "liquid crystal display" (LCD) means or similar means at 7-28 and 7-29 in preference to the "condition prompt lamps" mentioned throughout this text. Said LCD means may or may not be accompanied by a audible alarm means alerting both customer and retailer when appropriate conditions and functions are spelled out on the LCD.

Said LCD display means would be controlled by suitable CPU means and software and would have adequate capacity to spell out letter-for-letter and/or numeral-for-numeral and convey the appropriate message(s) and/or data to the appropriate person(s).

The preceding retailer entered data—namely the RIN, the access codes, phone number(s), etc., need only be entered once under normal conditions and can only be "re-programmed" by the retailer or his authorized agent(s) having access to the CPU "password" and then only by following similar proprietary procedure (using 7-20 and 7-45) as was used previously. Given that the retailer entered transaction data is stored within the CPU's memory means for automatic and constant use, the CPU's memory means need only capture the point of sale transaction data to form a complete transaction memory "package." Said point of sale transaction data would generally comprise: (a) The customer's PIN as entered by same at 7-27 and the required "OK" as entered at 7-33, and; (b) The customer's check amount as entered by the retailer at 7-20 and the customer's required "OK" response entered at 7-33. Having completed the transaction data "package", the CPU now automatically cites the access codes and numbers to connect with the appropriate financial network(s) means and transmits all necessary transaction data to complete the prescribed funds transfer and all associated designed functions of this device. A preferred embodiment of this device would include automatic "re-dialing" or repeated network access attempts until a suitable, working connection has been established. This re-dialing feature of the device's CPU means would help insure minimal time frames for customers and retailers alike at the point of sale during busy seasons and periods for the networks and retail establishments.

9) As previously mentioned, another feature of this device is its ability, via suitable CPU means and program(s), to allow the retailer to manually overcome random and occasional failures of the automatic MICR read function. Such failure would most likely be resultant from mutilated or damaged 6-24 MICR data which would preclude the 2-15(7-15) MICR read head means from properly scanning and/or "reading" said MICR document data. (The Federal Reserve Bank's high speed MICR read means typically experience a 1% to 2% "rejection" rate with said rejections having to be entered manually at the FED.) Failure of the designed automatic MICR read function (via the 2-15[6-15] read head means and connected, suitable CPU means) can be overcome manually be using the 7-20 keypad. The following scenario will describe this function. Expecting a normal "automatic" MICR scan and EFT/cancellation of the check, the retailer has entered the check into the device in the normal fashion. Instead of the device's normal "holding" of the check within itself directly under the 2-16 print means and the CPU's normal "waiting" for proper entry of PIN, check amount, "OK's", etc., the check is "indexed" or passed right out of the machine (for example, in the direction of the arrows seen on FIG. 2) by the CPU's engaging of the document feed means 2-7 (until the 2-46 "exit" switch determines the check has completely exited and notifies the CPU to stop 2-7). The check should automatically be expelled from the device when the device's CPU 16A means has NOT received and/or recorded the expected proper and suitable MICR data immediately following the triggering of the 2-13 switch means and subsequent MICR scan made possible by the action of the document feed means 2-7. Since the 2-13 switch began a normal cycle and the 2-7 was engaged, but a suitable MICR data package was not read and/or received by the CPU, the CPU means assumes that a MICR scan/read malfunction has occurred. The CPU may or may not trigger the "CLEAR PAPER" prompt means. If the retailer has determined that a fouled document is the cause of the MICR read malfunction, he can: (1) push the 7-44 index button to try to clear the impeded document which will automatically abort the entire transaction cycle, in which case no PIN, or "OK's" will be accepted, and/or (2) release the 4-36 (5-36) means to lift the 4-5 housing and physically remove said jammed document (if any). Said releasing of the 4-36 (5-36) means will activate the associated 4-36A switch means and notify the CPU 16A to abort the transaction cycle and no PIN or "OK's" or check amount can be accepted by the CPU. If a fouled document was the cause of the MICR read malfunction, then the retailer can clear the check from the device, attempt to restore and refurbish the document, and re-enter the document for a second trial of the transaction. Since the retailer cleared the fouled document by activating the (document) index button 7-44 and/or the release means 4-36 (5-36) and its associated 4-36A switch, and thereby "aborting" the normal transaction cycle, the device's CPU means 16A will view said "re-entry" of the (previously fouled) document as a new and separate transaction and operate accordingly. If the document in question was NOT fouled or "jammed" and instead the CPU (for lack of suitable, automatically entered [via 7-15 read head] MICR data) indexed the MICR document completely through and out of the device as confirmed by an indicative response light, the device's CPU concludes that a MICR read malfunction has occurred. In such case it could begin a second countdown (e.g., 30 second, but the time period is programmable and variable) in which time the customer must enter his PIN and "OK" the PIN when asked (prompted) by the CPU. This PIN entry and "OK" of PIN by customer will be received and placed in transaction memory by the CPU as if this were a normal transaction of the type previously described; but in this case, if the PIN is NOT received and "OK'd" within the allotted time, the CPU will abort the transaction (preparing itself for the next transaction automatically). However, assuming that the PIN and PIN "OK" have been (will be) received within the allotted time period, the CPU begins (at the same instant it began the PIN countdown) a similar 30 second countdown (here again, the time period is programmable and variable) in which the device's appropriate CPU (memory) means stands by to receive the MICR data from the document in question which will be manually entered by the retailer at the 2-20 (7-20) keypad means. Reading from left to right (in the same direction as if the check were normally inserted into the device for automatic scanning of the MICR) the retailer would enter digit-for-digit the entire MICR line which includes the elements of routing and transfer, Institutional Identifier, account number and check serial number as described previously. The retailer will read and enter the first nine digits, which include the check routing symbols, the institutional identifier and the check digit, and then press the 7-30 "ENTER" key. Then the retailer (continuing from left to right) will then enter the customer's account number and press (7-30) "ENTER" and likewise the check (serial) number and depress the (7-30) "ENTER" key. Pressing the (7-30) "ENTER" key in this case duplicates the "stop codes" of the (6-24) MICR line as if the 7-15 MICR read head means were being employed at this time and tells the CPU means how long to operate the 2-7(7-7) document feed means to correctly position the check within the device. While entering said MICR line manually, said MICR data is displayed digit-for-digit/stroke-for-stroke at the 7-28 retailer display means and if the retailer (operator) recognizes a mistake in his entry, he can press the 7-32 ("CANCEL ERROR" button which will restart automatically the timed (MICR entry) countdown and he may begin again.

After he has entered all required (6-24) MICR data, except the check amount, the retailer again enters the same check into the device (normally, as if manual entry had not been required) to complete the transaction. However, since the MICR data has already been entered (into CPU's memory) using the 2-20(7-20) keypad and the customer's PIN entry and "OK" is incoming and/or expected by the CPU, the re-triggering (this time) of the 2-13(7-13) switch (due to the re-entry of the check): (1) alerts the on-board CPU to begin operation of the 2-7(7-7) document feed means for proper and suitable positioning of the MICR document within the device with regard to all designed functions of said device, (2) causes the CPU to activate the 7-20-C "ENTER CHECK AMOUNT" prompt lamp and to stand by for the retailer's entry (at 7-20) of the check amount and thereby to receive said amount into the appropriate CPU memory means, (3) extinguish the 7-20-C "ENTER CHECK AMOUNT" prompt lamp upon the receiving of the check amount into memory, and cause the entered check amount to be displayed at both 7-28 and 7-29, (4) cause the CPU to light the 7-20-F and 7-27-F "OK THE AMOUNT" prompt lamps and to stand by to receive the "OK" from 7-33 (customer's "OK" button) and (5) cause the CPU, after receiving the "OK'd" check amount, to extinguish the 7-20-F and 7-27-F "OK THE AMOUNT" prompt lamps (or some other type of suitable prompt means). In such manner a "normal automatic" MICR entry made by the 7-15(2-15) read head means and associated CPU means which was "rejected" can be manually introduced into the device and the transaction can thereby proceed normally to completion.

10) A common, reliable printer means (2-16 and 2-17) with its electronic printer control means (2-18), if required, should also offer ease of service and/or replacement by qualified service personnel. It may or may not use a common ink "ribbon" which could be replaced by the retailer. Applicants anticipate use of printer means already in manufacture as of the date of this patent application.

11) Since pressing the 7-44 "index" key prior to the device's (CPU's) automatic network access results in an aborted transaction, this same 7-44 "index" key can be thought of as an "abort" key. It should be noted, however, that due to (financial) network and/or financial institution(s) software, once the transaction data package has "entered" the network (LAN) this abortion function may not operate effectively. It is intended that pushing key 7-44 to achieve an "abort" function will be effective if it is pressed prior to the device's (CPU) connection to the network means.

12) Software and/or hardware means and functions other than those described in this patent disclosure may also be employed in ways well known to this art.

13) A specific version of this device, especially adapted for use in a larger installation, would be the device as otherwise described herein, but without its own on site CPU. That is to say, all "CPU" functions may be carried out by a "PC" computer located somewhere in the building (installation) but not necessarily at the point of sale as in a large department store, or by a centralized, off-site, CPU utilized by several point-of-sale mechanisms. In such case the on-site point-of-sale device would require only the MICR read head and means to connect it to the LAN and thereby transmit the MICR data along with the amount of the check as entered by the retailer at 7-20 and the PIN and the PIN OK and the "OK the amount" as entered by the customer at 7-27. The retailer identification number(s) and the network access code(s) and all required network numbers to access the carrier and/or network(s) also could be supplied by an "outboard" computer such as a suitable PC. Said PC or similar means could also tally the transferred (EFT'd) total for the retailer at the end of each shift or day. Said PC may also, if necessary, control the printing of the negotiable MICR documents and thereby eliminating the 7-18 "printer control" electronics. Thus the machine would contain the MICR read head means and communication means to the central (LAN) computer. It would also contain the keypads, both 7-20 and 7-27 and all their functions. Also, it would contain the print means to endorse the check and print all required data on the reverse side of the check and, of course, the 2-7 document feed means.

TRANSACTION/VERIFICATION/EFT/CANCEL CYCLE

A normal transaction cycle would begin with the device and it's CPU completely void of any transaction data from the previous transaction; namely, the device would NOT contain the previous customer's personal identification number, his "OK" of PIN command, his "OK the amount" command or the amount of the check as entered by the retailer at 7-20. The CPU means (if NOT connected to a LAN and/or central computer) would however have at its continual disposal the retailer identification number(s), and the network(s) and carrier(s) access codes or means enabling the device to automatically "dial" and access the appropriate carriers and networks and to identify this particular retailer to all required network(s), financial institutions, carriers, etc. The device's CPU means (whether external or on-board [internal]) automatically "dumps" or erases all customer transaction data (PIN, OK's, check amount) immediately upon completion of each transaction, but retains for each use the retailer transaction information. A typical transaction scenario would include:

1) The retailer would verbally or by means of his cash register means, indicate to the customer the amount of the sale.

2) The customer would fill out and sign his check (or other MICR document) and pass it to the retailer.

3) Retailer could visually examine the check and perform any personal identification procedures he wishes at this time. If a printed symbol on the check indicating a participating bank and customer is used, the retailer could note such at this time. If such a symbol will be used in the future by check printing companies, and if this check has said symbol, the retailer could enter the check into the device as described elsewhere.

4) Immediately upon the check entering the device and engaging the 7-13 switch, the CPU performs a number of functions including: (A) The "ENTER PIN" prompt lamps light at 7-20 and 7-27; (B) the "ENTER CHECK AMOUNT" prompt lamp lights at 7-20.

5) The CPU can receive data in any order and/or simultaneously from both keypads 7-20 and 7-27; and if used receive data from a proper and suitable electronic cash register connected to said device in the previously described manner. The retailer would then enter the amount of the check using keypad 7-20. As the retailer enters the amount of the check, it is displayed at window 7-28 digit-for-digit/stroke-for-stroke and should the retailer notice an error in his entry of the amount, he can depress the "CANCEL ERROR" button 7-32 and re-enter the amount. If the amount entered is correct, then the retailer would press the "ENTER" button 7-30.

6) At the same time as #5 above, the customer would see the "ENTER PIN" prompt lamp and enter his PIN. If the customer notices that he has erred, he can press his "CANCEL ERROR" 7-31 button and begin again. When the customer has entered his correct PIN, he would then press the "ENTER" button 7-30A which would place the PIN entry into the CPU memory means (or send it to the LAN CPU). This pressing of the "ENTER" (PIN) button 7-30A would extinguish the "ENTER PIN" prompt lamps 7-20 and 7-27 and the "OK THE PIN" prompt lamps 7-20 and 7-27 would light. Several embodiments of PIN entry and PIN "OK" processes are described elsewhere.

7) Immediately after the retailer's entry of the check amount and his pressing of the "ENTER" (amount) key 7-30, the "ENTER CHECK AMOUNT" prompt lamp 7-20 would extinguish and (a) the check amount would be displayed at the customer's amount display means 7-29; (b) the check amount, which was being displayed digit-by-digit at window 7-28 as the retailer entered it, would continue to be displayed at 7-28, (c) the "OK THE AMOUNT" prompt lamp would light at the customer's keypad 7-27 and 7-20. When the customer presses the "OK" (the amount) key 7-33, the "OK THE AMOUNT" prompt lamps extinguish at 7-20 and 7-27 and the "OK'd" amount then enters the appropriate CPU memory and is sent to the electronic cash register (if used) to become a part of the cash register's tally and printing.

It also should be understood that when the "OK" the amount button 7-33 is pushed, said action allows the entered amount to become part of the transaction information. However, it is NOT tallied or recorded as a part of the completed sale UNTIL AFTER the amount has actually been transferred into the payee's account and acknowledgement of this fact is received from the computer means governing the payee's account. Only when this amount is paid to payee's account and verification of that fact received is the amount entered into the CPU 16A, the LAN computer or electronic cash register to become part of a record of cash paid and received by the retailer.

8) When all "local" transaction data has been entered, namely the check amount, the PIN and customer's "OK" of both the PIN and the check amount, the device's CPU means 16A immediately calls up the carrier and or network access codes and begins the process of contacting the carrier(s) and/or network(s). The CPU 16A would complete the transaction data package by adding to the customer's transaction data the stored retailer transaction data which includes his retailer identification number and any other such security data as may be required by the network.

9) When the complete transaction data "package" is in the network means, the network means would automatically route the "package" to the appropriate payor's bank using the FED's routing and transit symbols to locate the payor's bank institution. The transaction from here (and perhaps from the point the data package enters the network) resembles a common "debit card" transaction in that: (a) the payor's bank CPU means encrypts/decrypts the data package as necessary, (b) there is verification of the existence of the payor's account, (c) there is verification of the PIN through whatever means this particular institution chooses to use, (d) recordation of the transaction is made and, (e) the amount of the check (or MICR document) along with the transaction data package is transmitted back to the appropriate network means.

10) The network means, receiving the appropriate transaction package back along with the cash transfer, would then route said package to the payee's banking institution using the payor's routing and transit numbers (entered when the retailer bought the device as described elsewhere). When the data package has reached the payee's financial institution, it would also proceed much the same as if this were a common debit card transaction. Among other things, said institution would: (a) encrypt and decrypt the information as necessary, (b) verify the retailer identification number (RIN), (c) verify the payee account number and perform any security checks which connect the RIN with the payee account number as it chooses, (d) deposit the funds into the payee account, (e) verify that the funds have been deposited, and (f) return verification of deposited funds along with endorsement data and all necessary routing data back to the network. The RIN and/or payee's account number or other proprietary means may be used to enable the payee's bank's CPU means to transmit a (partially prerecorded) endorsement and cancellation data package to properly endorse the check with the payee's required name and bank, amount deposited, time, etc. as previously described. Time affected data, such as time of day and amount deposited would not be "prerecorded."

11) When the transaction data package returns from the network to the device's CPU means, said device's CPU means: (a) verifies that the amount has been deposited, (b) records all endorsement data and all other such necessary data to endorse and cancel the check upon verification of transfer of funds, (c) send all necessary information to associated electronic cash register means upon receiving verification that the funds have been transferred in order that it might take notice of the "amount tendered", which in this case is the same as "cash tendered" and (d) disconnects from all network means upon receiving of the data returned from the network so recorded.

12) At this point the CPU will engage the print means to print the endorsement and cancellation data on the check as described elsewhere. The electronic cash register (if used) can now print its sales slip taking note of the transferred funds as "amount tendered" or "cash tendered."

13) The check is printed and expelled from the device and the CPU erases or dumps from memory all entered customer transaction data AND all cancellation data which includes the endorsement data, the amount time, etc. The CPU only retains the retailer transaction data as described elsewhere. When this transaction is completed and the check has been expelled as verified by the "exit switch" 7-46, the "TRANSACTION COMPLETE" prompt lamps 7-20-E and 7-27-E light. The retailer can then pass the cancelled check back to the customer as part of the customer's sales record and receipt. If necessary, the retailer could print a "cash ticket" to place into his cash register by placing an NCR page behind the check and inserting the pair into the device to be printed simultaneously.

It will, of course, be understood that various changes may be made in the form, details and arrangements of the components, as well as in the procedures and functions carried out by them, without departing from the scope of the invention which consists of the matter shown and described herein and set forth in the appended claims.

Thus having disclosed our invention; we claim:

1. A point-of-sale negotiable instrument processing device comprising:
   (1) a housing having a first compartment, a second compartment and a spacer means which positions the first compartment next to the second compartment so as to define a slot between said first and second compartments;
   (2) MICR read head means for reading MICR information on a negotiable instrument;
   (3) printer means for printing on a negotiable instrument;
   (4) switching means to initiate preprogrammed CPU functions upon the negotiable instrument;
   (5) motive means for moving the negotiable instrument: (a) into position in the slot so as to be read by the MICR read head means, (b) into position to be printed upon and (c) into and out of the slot;
   (6) positioning means for positioning the negotiable instrument in the slot so that MICR information on the negotiable instrument can be read by the MICR read head means and for positioning the negotiable instrument in the slot so that the rear side of the negotiable instrument can be printed upon;
   (7) alpha/numerical keypad means for transmitting information to a CPU;
   8) a CPU for receiving information from the alpha/-numerical keypad means and the MICR read head means in order to communicate said information to a telecommunications system in order to transfer funds represented by the negotiable instrument from an account of the maker of the negotiable instrument to an account of the payee of the negotiable instrument; and
   (9) means for electronically connecting the point-of-sale negotiable instrument processing device to a telecommunications system.

2. A point-of-sale negotiable instrument processing device comprising:
   (1) a housing having a first compartment, a second compartment and a spacer means which positions the first compartment above the second compartment in a stacked configuration so as to define a slot between said first and second compartments;
   (2) MICR read head means, located in said second compartment, for reading MICR information on a face side of a negotiable instrument;
   (3) printer means, located in said first compartment, for printing on a rear side of the negotiable instrument;
   (4) switching means to initiate preprogrammed CPU functions upon the negotiable instrument;
   (5) motor means for moving the negotiable instrument (a) into position in the slot so that MICR information on the negotiable instrument can be read by the MICR read head means, (b) moving the negotiable instrument into position in the slot so that the rear side of the negotiable instrument can be printed upon and (c) moving the negotiable instrument out of the slot;
   (6) means for positioning the negotiable instrument so that MICR information on said negotiable instrument can be read by the MICR read head means;
   (7) means for positioning the negotiable instrument so that the printer means can print on said negotiable instrument;
   (8) a retailer's alpha/numerical keypad for transmitting information to a CPU;
   (9) a customer's alpha/numerical keypad for transmitting information to a CPU;
   (10) a CPU for receiving information from the retailer's alpha/numerical keypad, the customer's alpha/numerical keypad and the MICR read head means in order to communicate said information to a telecommunications system in order to transfer funds represented by the negotiable instrument from an account of the maker of the negotiable instrument to an account of the payee of the negotiable instrument; and
   (11) means for electronically connecting the point-of-sale negotiable instrument processing device to a telecommunications system.

3. The device of claim 2 which further comprises a security code system.

4. The device of claim 2 which further comprises means to access a computer system maintained by an issuer of a negotiable instrument.

5. The device of claim 2 which further comprises means to access a computer system maintained by a group of retailers using a centralized CPU system.

6. The device of claim 2 which further comprises means to enter a customer's PIN identification number.

7. The device of claim 2 which further comprises means to connect the MICR read head means and a PIN identification number entry means to the printing means so that the printing means is actuated only when signals are compatible.

8. The device of claim 2 which further comprises means to access an external communications system to identify a payor of a negotiable instrument through use of a personal identification number.

9. The device of claim 2 which further comprises a plurality of signal devices indicating the condition of a plurality of circuits contained in said device.

10. The device of claim 2 which further comprises means to display the amount of the transaction, as indicated on the negotiable instrument, to both the retailer and the customer.

11. The device of claim 2 which further comprises means to produce an imprinted copy of a transaction processed by use of the device.

12. The device of claim 2 which further comprises a data entry override means.

13. The device of claim 2 which further comprises a personal identification number module having a key tab matrix connected to the CPU, wherein said key tab matrix is set to match a transaction amount to be recorded with an override means connected to the CPU for actuating said printing means.

14. The device of claim 2 which further comprises hinge means to separate the first compartment from the second compartment and thereby expose a space defined by the slot.

15. The device of claim 2 which further comprises a table having a perpendicular edge which table is located on the second compartment in order to facilitate travel of, and MICR head reading of, the negotiable instrument while it is in the slot.

16. The device of claim 2 which further comprises magnetic stripe read head means.

17. The device of claim 2 which further comprises means to read Universal Product Code data.

18. The device of claim 2 which employs optical read head means in place of the MICR read head means.

* * * * *